US010693821B2

(12) United States Patent
McEvoy et al.

(10) Patent No.: US 10,693,821 B2
(45) Date of Patent: *Jun. 23, 2020

(54) SYSTEM AND METHOD FOR DELIVERING INLINE INTERACTIVE OBJECTS ENCAPSULATED IN A MESSAGE

(71) Applicant: Engagio, San Mateo, CA (US)

(72) Inventors: Michael McEvoy, San Jose, CA (US); Jamie Faye Fenton, San Jose, CA (US); David Temkin, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,910

(22) Filed: Apr. 9, 2019

(65) Prior Publication Data

US 2019/0306099 A1    Oct. 3, 2019

Related U.S. Application Data

(63) Continuation of application No. 15/069,756, filed on Mar. 14, 2016, now Pat. No. 10,257,141.

(60) Provisional application No. 62/133,269, filed on Mar. 13, 2015.

(51) Int. Cl.
| | | |
|---|---|---|
| *H04L 12/58* | (2006.01) | |
| *H04L 29/06* | (2006.01) | |
| *H04L 29/08* | (2006.01) | |
| *G06Q 30/06* | (2012.01) | |

(52) U.S. Cl.
CPC ......... *H04L 51/10* (2013.01); *G06Q 30/0601* (2013.01); *H04L 51/18* (2013.01); *H04L 63/08* (2013.01); *H04L 67/02* (2013.01); *H04L 67/06* (2013.01)

(58) Field of Classification Search
CPC .... G06Q 30/0601; G06Q 30/02; G06Q 30/06; G06Q 10/10; G06Q 50/32; G06Q 50/01; H04L 51/10; H04L 51/18; H04L 51/08; H04L 51/22; H04L 51/32; H04L 63/08; H04L 63/083; H04L 67/02; H04L 67/06; H04L 67/04; H04L 67/10; H04L 67/34; H04L 43/08; G06F 3/04812; G06F 3/0485; G06F 3/0488; G06F 21/566; G06F 3/048; G06F 3/03; G06F 3/04842; H04N 21/431;

(Continued)

(56) References Cited

U.S. PATENT DOCUMENTS

| 8,700,691 | B2 * | 4/2014 | Gittelman | G06F 16/957 |
|---|---|---|---|---|
| | | | | 709/201 |
| 9,317,857 | B1 * | 4/2016 | Terleski | G06Q 30/02 |

(Continued)

*Primary Examiner* — Alina A Boutah
(74) *Attorney, Agent, or Firm* — Brian R. Galvin; Galvin Patent Law LLC

(57) ABSTRACT

A system and method for delivering text, media, and inline interactive data (called message content) encapsulated in a message-based conversation has been devised. Content of multiple types are rendered and manipulated using interactive program code objects, downloaded when first needed from a repository, present on the message device. Inline interactive data can be shared and manipulated by participants in a message conversation as part of and in context with the ongoing conversation. Sharing and data integrity of the inline interactive data as well as conversation participant authentication, privileges and conversation security is managed by a central message server.

16 Claims, 9 Drawing Sheets

(58) Field of Classification Search
CPC ......... H04N 21/4333; H04N 21/44204; H04N 21/47217; H04N 21/482; H04N 21/812
See application file for complete search history.

(56) References Cited

U.S. PATENT DOCUMENTS

| | | | |
|---|---|---|---|
| 2005/0114781 A1* | 5/2005 | Brownholtz | G06F 3/0482 715/733 |
| 2010/0205544 A1* | 8/2010 | Brzeski | H04L 12/66 715/758 |
| 2012/0158513 A1* | 6/2012 | Schoen | G06Q 30/0269 705/14.66 |
| 2012/0232955 A1* | 9/2012 | Riazzi | G06Q 30/02 705/7.32 |
| 2012/0290945 A1* | 11/2012 | Byrne | G06Q 50/32 715/752 |
| 2013/0073932 A1* | 3/2013 | Migos | G06F 15/0291 715/201 |
| 2013/0218985 A1* | 8/2013 | Thazhmon | G06Q 10/10 709/206 |
| 2013/0339857 A1* | 12/2013 | Garcia Bailo | G06F 3/0484 715/723 |
| 2015/0350147 A1* | 12/2015 | Shepherd | H04L 51/24 715/752 |
| 2016/0080308 A1* | 3/2016 | Li | H04L 63/083 709/206 |
| 2017/0097754 A1* | 4/2017 | Byrne | G06Q 50/32 |
| 2018/0075875 A1* | 3/2018 | Doherty | G11B 27/102 |

* cited by examiner

SYSTEM AND METHOD FOR DELIVERING INLINE INTERACTIVE OBJECTS ENCAPSULATED IN A MESSAGE

CROSS-REFERENCE TO RELATED APPLICATIONS

| Application No. | Date Filed | Title |
|---|---|---|
| Current application | Herewith | SYSTEM AND METHOD FOR DELIVERING INLINE INTERACTIVE OBJECTS ENCAPSULATED IN A MESSAGE Is a continuation of: |
| 15/069,756 | Mar. 14, 2016 | SYSTEM AND METHOD FOR DELIVERING INLINE INTERACTIVE OBJECTS ENCAPSULATED IN A MESSAGE which claims benefit of, and priority to: |
| 62/133,269 | Mar. 13, 2015 | System and Method for Delivering Text, Media, and Inline Interactive Objects Encapsulated in a Message and Messaging Application to a Mobile or Other Devices | the entire specification of each of which are incorporated herein by reference.

BACKGROUND OF THE INVENTION

Field of the Invention

The current invention is in the field of instant messaging, more specifically instant messaging augmented by a plurality inline interactive objects that provide capabilities far beyond those found in ordinary messaging applications without the user having to leave the message application.

Discussion of the State of the Art

On the Internet, including the World Wide Web (the Web), content is stored on servers and usually accessed by a client application such as a browser running on a mobile or fixed device. Advances in wireless communication technology have led to a convergence of sorts, as now wireless subscribers can access and receive web content via a mobile device such as a cell phone. Wireless web access is typically accomplished using a specialized browser like application on the mobile device. The subscriber must subscribe to web services through a wireless service carrier such as a wireless phone company, or be connected to the Internet by either a wired or wireless connection.

Currently, content is delivered to the user by any of various means, including, but not limited to, a web browser, a messaging client, email clients, a specialized mobile application specific to the task of interest. This paradigm now extends to digital wearables such as the Apple Watch or Pebble devices. If the user requires client-side programming—commonly called a web application—said programming often consists of HTML, CSS, and JavaScript delivered to a web browser for local execution and supported by server-side Web services. The other typical option for client-side programming is to for a developer to create a custom client-side application for a given interaction. In the past, companies have created applications that can be embedded in emails and directly executed, one such product went by the trade name of Zaplets, which ran on non-mobile devices. Email, being an asynchronous form of electronic communication, is fundamentally different from "instant" messaging, which is a synchronous form of communication.

All current messaging options suffer from a fundamental weakness: the user does not have a seamless experience where an application and a conversation that employs the application exist within one user space. A conversation is, instead, typically a linear stream of text messages, photos, videos, and possibly other simple assets. To utilize any more complicated applications or capabilities, the user is instead required jump from one application to another external to the messaging conversation and is unable to easily share and interact with other users on the same task.

What is needed is a system and method for the creation, embedding, and use of application programs in the conversation contained in a messaging application (a synchronous communication method vs. an asynchronous communication such as email), creating a new generation of flexible computing platform on which robust and complete user experiences and solutions can be created to solve many problems in many different domains by any party, much like a computer operating system enables other programs to be installed and run. To date, the solution to these problems has been to either add fixed widgets to the messaging application's conversation or to rely on external disconnected applications outside of the messaging application to create a solution. This solution brings the application programs directly into and in the context of the conversation, creating a seamless solution. From the user's perspective, a conversation becomes a linear stream of text messages, photos, videos, and other assets with the addition of inline interactive objects that may look and act like individual applications but are, in fact, an integral part of the conversation and communicate with identical or similar applications on the devices of other participants in the messaging conversation so that all see the same information in the same context in real time and can interact with that information. In essence, a new custom engine to communicate and/or solve a problem is created by each new conversation as the members of that conversation discuss a problem, share information in an unstructured form, add appropriate inline interactive objects to share and collaborate on mutually managed, structured information.

SUMMARY OF THE INVENTION

According to a preferred embodiment of the invention, a system for delivery of text, media and inline interactive objects encapsulated in a message the system comprising: a message server stored in a memory of and operating on a processor of a computing device, an inline interaction object repository stored in a memory of and operating on a processor of a computing device and a plurality of message delivery devices stored in memories of and operating on processors of at least two computing devices. The message server serves as a hub through which a plurality of messages pass, receives messages at least one of which will contain content requiring the use of an inline interactive object to display or manipulate determines from a target message delivery device whether that target device has inline interactive objects needed to render and manipulate inline objects included in an incoming message and offers a method to procure any needed inline interactive objects to render or manipulate inline data encapsulated within the incoming message. The inline interaction object repository maintains copies of inline interactive objects available for download.

Finally, the message delivery devices accept messages some of which may have encapsulated interactive data, run inline interactive object resources needed to render and manipulate encapsulated content within an message, and allows user to initiate a new message conversation with other users using an identification for that other user.

According to another preferred embodiment of the invention a method for delivery of text, media and inline interactive objects encapsulated in an message the steps of the method comprising: (a) receiving an message at a message server containing additional inline media and data that requires the use of inline interactive programming objects to render and manipulate; (b) confirming that a first message delivery device about to receive the message has required to render and manipulate the additional inline media and data, if not sending an alert offering to assist in procurement of needed inline interactive programming objects; (c) allowing the first message delivery device to enter an interactive conversation with one or more second message delivery devices to interact as a group with the additional inline media and data while concurrently communicating with additional messages, some of which encapsulate novel additional inline media and data.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
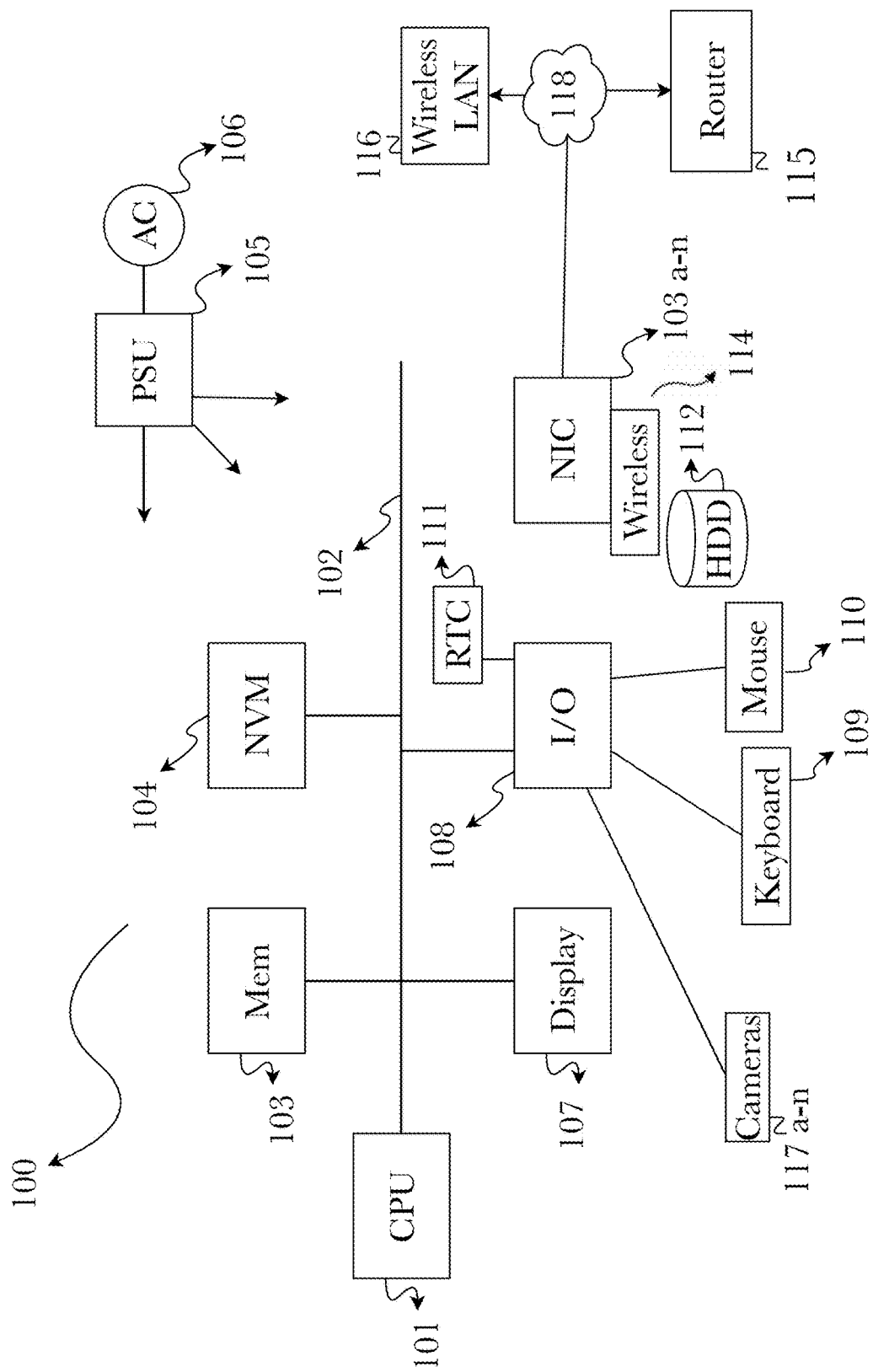
FIG. 1 shows a computer system as currently may be typically used as a generic computing device for an end user device, both stationary and or portable, or a server.

The inventor has conceived, and reduced to practice, a system and method for embedding inline interactive object into message conversations.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 7:
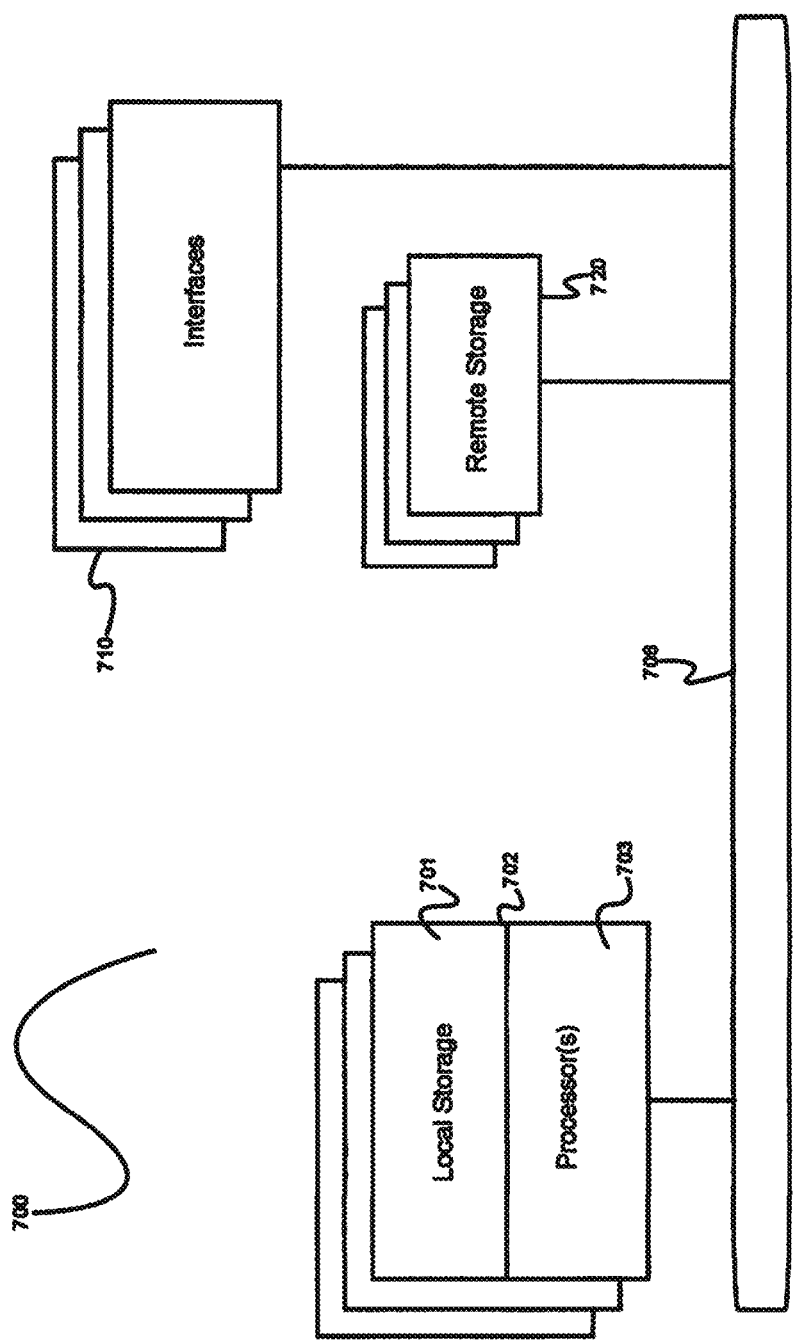
FIG. 7 is a block diagram depicting an exemplary computing device suitable for implementing at least a portion of the features or functionalities disclosed herein

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
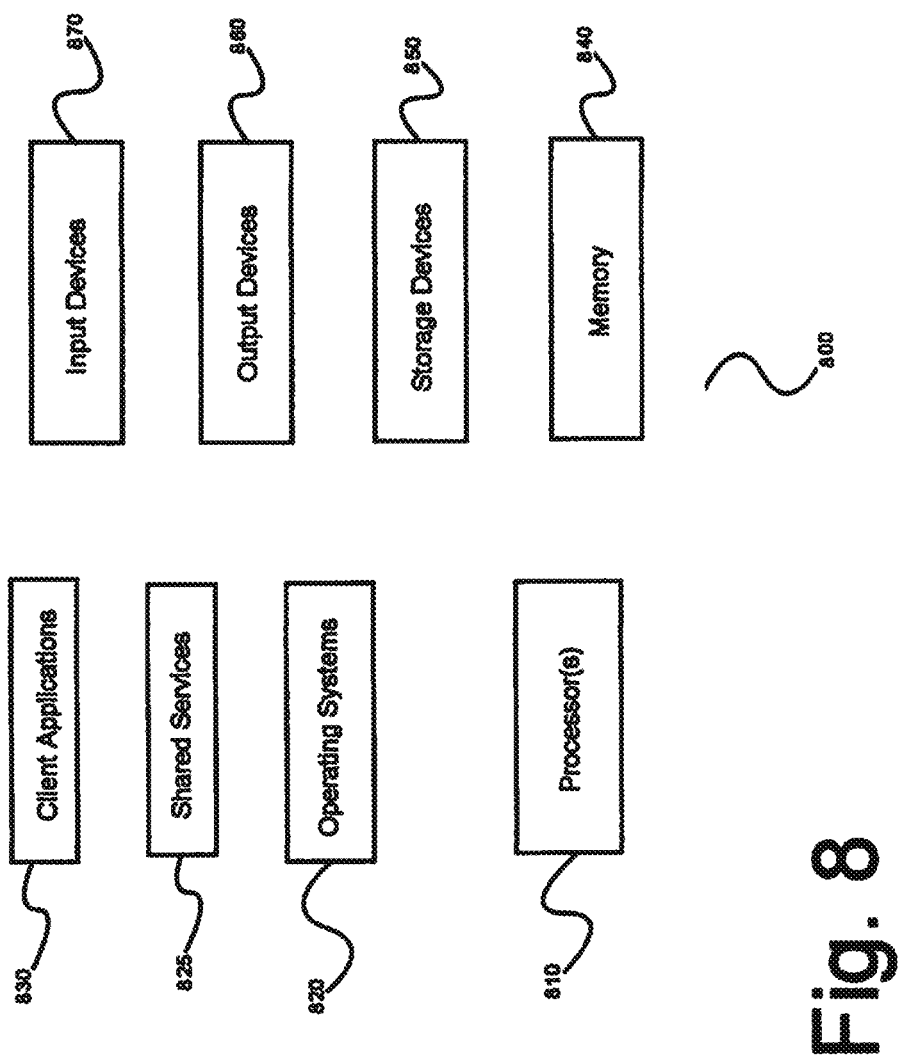
FIG. 8 is a block diagram depicting a typical exemplary architecture of one or more embodiments or components thereof on a standalone computing system.

In some embodiments, systems according to the present invention may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 9:
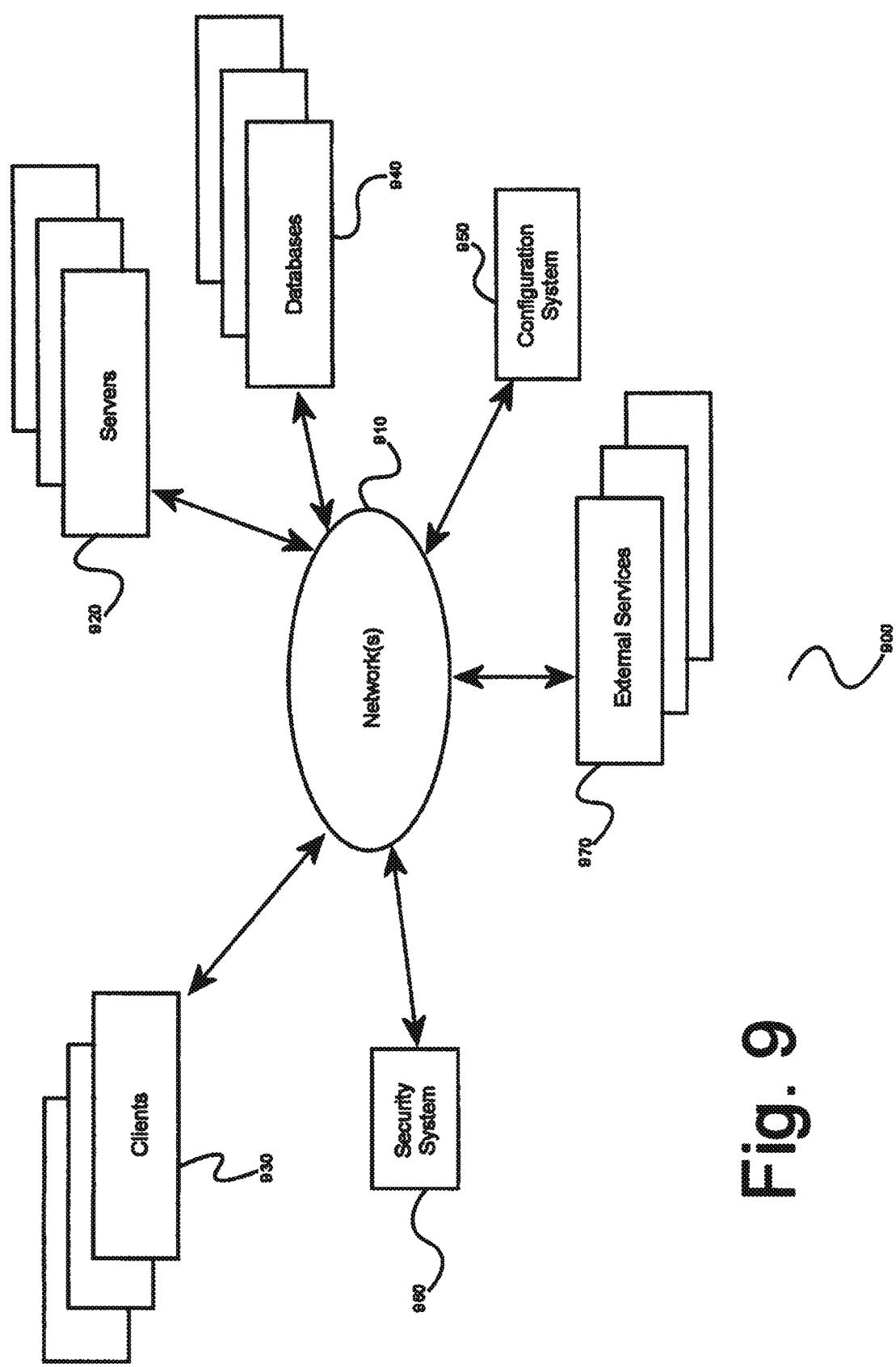
FIG. 9 is a block diagram depicting an exemplary architecture for implementing at least a portion of a system according to an embodiment of the invention on a distributed computing network.

In some embodiments, systems of the present invention may be implemented on a distributed computing network, such as one having any number of clients and/or servers. Referring now to FIG. 9, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 1 shows a computer system 100, as currently may be typically used as a generic computing device for an end user device, both stationary and or portable, or a server. Computer system 100 is exemplary of any computer that may execute code to process data. Various modifications and changes may be made to computer system 100 without departing from the broader spirit and scope of the system and method disclosed herein. CPU 101 is connected to bus 102, to which bus is also connected to memory 103, non-volatile memory 104, display 107, I/O unit 108, and network interface card (NIC) 113. I/O unit 108 may, typically, be connected to an input device 109, such as a keyboard, a touch screen, buttons, etc., mouse or any other suitable graphical input device 110, hard disk (or in some cases other suitable storage, including, but not limited to solid state disk, RAID, network attached storage, storage area network, etc.) 112, one or more cameras 117*a-n*, and real-time clock 111. One or more network cards/interfaces 113*a-n*, some of which may be wireless 114, may connect to WANs 115 or wireless LANs 116, all of which are connected via Internet 118. Also shown as part of system 100 is power supply unit 105 connected, in this example, to ac supply 106. Not shown are batteries that could be present, and many other devices, including but not limited to special enhanced pointing or navigational devices, such as mice, jog wheels, etc., microphone(s) and speaker(s) and/or headset(s) for recording and or playing back audio, and other modifications that are well known but are not applicable to the specific enhanced functions of the current system and method disclosed herein.

Figure 2:
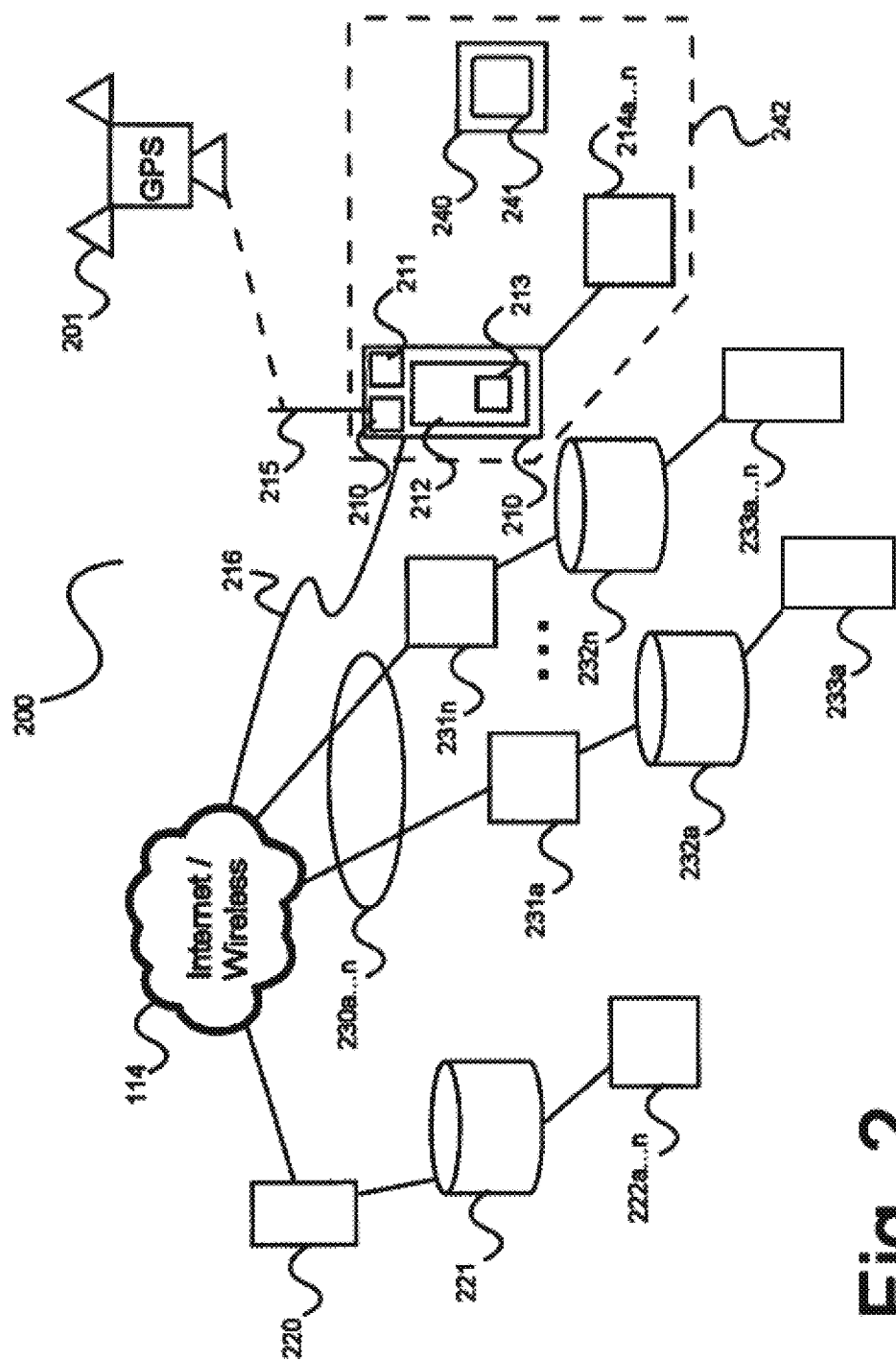
FIG. 2 depicts an overview of an exemplary system embodiment depicted as a set of network connected devices interacting with a consumer device engineered to interact with the invention.

FIG. 2 shows an overview of an exemplary system embodiment 200, depicted as a set of network connected devices interacting with a consumer device 242 engineered to interact with the invention. The one or more wireless networks and the internet 114 are configured, for the purposes of the system and method disclosed herein, as one conglomerate network, even though it is clear that multiple carriers and other wireless LANs may be offered. An operating center has a service control module 220 that is connected mass storage 221 and programmed devices 222*a-n* that are used to provide the service of the system and method disclosed herein, which service is described later and throughout. Note that service control module 220 operates on hardware with a structure similar to the computer discussed in FIG. 1. Control modules 233*a-n*, connected to support hardware at participating partners as well as user devices 242 at those partners' locations are connected to the Internet via connections 230*a-n*. Each control module 233*a-n* or client device 242 is connected to its own web service system 231*a-n* (in some cases, they may have their own web infrastructure; in other cases, the individual components 231*a-n*, 232 *a-n*, 233 *a-n* each could be distributed across different devices to better handle peak loads of large resource requests). Servers 231a-n may have a structure similar to the computer discussed in FIG. 1. Each web service system 231a-n (whether real or distributed) has its own storage pool 232a-n and its own sets of specially optimized software 232aa-an through 232na-nn. Also shown is a user carried device 210, that device could be a smart phone a tablet or a smart watch all of which possess a structure similar to the computing device discussed in FIG. 1. Device 210 contains, in this example, software 214a-n, a camera 211, and in some cases a GPS 215 chip that communicates with GPS satellites 250a-n. Software 214x may be machine-readable code that is stored on a storage media, or downloadable over a network connection, and installed on a mobile computing device 210. The user in the field, for example at his home, at his office, in a testing lab, or anywhere else uses device 210 to interact with the servers delivering the content as a web service, typically using one or more of the message controllers and servers described herein. The user clicks on an interface icon to activate the capabilities disclosed herein 213 and contained on device 210 and follows the instructions that appear on the screen, thus pulling up additional data from the service controller as discussed further herein. Further, it shall be deemed equivalent if, for example, instead of so-called on premise servers and or cloud services, a third-party is used for hosting the server side services described 230 a-n, 231 a-n, 232 a-n, 233 a-n.

The system and method disclosed herein can create messaging conversations that send text, pictures, video and other media and can embed application programs in the conversation within a messaging session. The messaging device, running an industry-standard messaging infrastructure such as XMPP (http://en.wikipedia.org/wiki/XMPP) or Layer (https://layer.com), an identity management solution to identify users and enable the routing of messages to the correct users, along with a server-side infrastructure that manages, secures, and delivers selected inline interactive objects (IIO) to members of the conversation. In addition, server-side support 230 a-n, 231 a-n, 232 a-n, 233 a-n in the form of IIO object management, service support, and related tasks is available to support the execution of the in-message interface objects for each user's client device 242.

While the system of the invention duplicates to some degree the functions of typical messaging applications and infrastructures such as Apple's iMessage and Facebook's WhatsApp with provided messaging experiences that have been available in related forms for more than ten years, the invention then adds the unique ability to inject IIOs into the conversation's messages that are connected and running on the client devices of other participants of that conversation so that they can continue their dialog while seamlessly interacting with additional applications that augment the interaction. This ability to inject IIOs into the conversation enables participants to have a side-by-side conversation while sharing the operation and control of contributory applications, in essence providing a digital application-centric conversation. It will be appreciated by one having ordinary skill in the art that "message" and "messaging application" may refer to "instant message" and "instant messaging application", as are well known in the art, but they are not so limited. In general, any electronic message system capable of software-based control may be used according to the invention, including for example short message system (SMS), multimedia message system (MMS), text chat and chat relay systems, and the like.

Each inline interactive object has significant capability and resources outside the scope of a typical stand-alone application. These characteristics include, but are not limited to, the ability to utilize the knowledge about the members of the conversation to achieve various goals. Examples of such goals, listed in no particular order, include the ability to interact with other users in the context of the conversation; to interact with other inline interactive objects within the message; to interact with inline interactive objects external to the message; to interact with internal and external services and devices to potentially extract information such as user and conversation partner identity from external sources such as, for example, in human resources management solutions, if granted access by employer, Facebook, to the extent granted, and LinkedIn to the extent granted; to access respective user and conversation partner calendars, to the extent of granted access; to access and use member location data, if access is granted; to access and use data expressed in the conversation's text and media objects; to use knowledge of beacons local to the members of the conversation; to send data and signals between in-conversation, outside conversation, and remote inline interactive objects; to send data and signals between inline interactive objects and external devices and services that comprise the Internet of Things (IoT); to send data and signals between inline interactive objects and members of the conversation as well as to selected non-members of the conversation via email, SMS text, and other digital means; to operate in the computational foreground, visible to the user as well as operate in the background, invisible to the user and/or in the conversation; to be purchased and downloaded from an on-line store and sold to users via in-app digital payment, on a one-time charge basis, or on a subscription basis; to support a permission model where each widget is granted permission by each participant in a conversation to access information for each of the participants' devices and personal data; to be presented to the user as collections of related inline interactive objects via an interactive hierarchal form that is dynamically loaded on the mobile or fixed device 242; to be listed on a menu, palette, or similar visual selection object, and inserted into a conversation by a user making an interactive selection from a palette which can be changed both with and without an update to the messaging application; and to be viewed in-line chronologically with other components of the conversation and in summary form, where only the inline interactive objects in the conversation are visible.

In some cases, a system and method for delivering text, media, and inline interactive objects in a message and displaying them to a client messaging device 242, may comprise a messaging service and infrastructure that reliably and securely transports text, media, and IIOs along with an optional proprietary electronic certificate to ensure that the delivered elements have been sent from an authorized source. The system may send message content, including text, media, and IIOs, from the message controller 233a-n via the Internet 214 to the messaging device 242, which may be web based or run directly on a mobile of fixed device, configured to interact with a user based on that user's unique identifier. Further, message content may be stored on a message controller 233 a-n, for delivery to the client's message device 242 on demand. In addition, the needed programming changes to enable the message device 242 may be received from a message controller 233 a-n. The client's messaging device may also upload a to a server for distribution to other parties and/or processing by external programs or via server side extensions of the message content. Additionally, a control center may be connected to the network and configured to receive data from the messaging program and to track the delivery of the message content.

Further, in some cases, along with the message an inline interactive objects program code is provided, and in some of those cases, providing those IIO programs includes downloading additional IIOs from a server to a client message device. Additionally, in some of these cases, a portion or all of the IIO code includes code that executes on a server that hosts or interacts with the remote IIO code. Furthermore, in some cases part or all of the selected message content is used as additional information for processing by the target IIOs from another computer. In yet other cases, the method for processing a message might include selecting the target IIO and executing the code on the targeted IIO. In some cases, the messaging program may also upload a message to a server for distribution to other parties and/or for processing by external programs or via server side extensions of the message content while monitoring the delivery of the target message content. Furthermore, a method may deliver IIOs to a mobile or fixed device, including the steps of providing IIO program code to the messaging device that can interact with the user in the context of an ongoing conversation, interact with other IIOs within the message, interact with IIOs external to the message, as well as possibly interacting with internal and external services and devices. Additionally, in some of these cases, the IIO could be further applied operating in the context of the conversation utilizing multiple classes of contextual information. In yet further examples of possible use cases, an IIO operating in the context of the conversation may also be executed utilizing the identities of those in the conversation to supply the context. In yet other cases, the IIOs operating in the context of the conversation may also be executed utilizing the identities of those in the conversation to extract information from external sources, such as identity management solutions and external data sources such as Facebook and LinkedIn. In yet other cases, the IIOs are operated in the context of the conversation utilizing the identities of those in the conversation and their respective calendars. Additionally, the IIOs may be operated in the context of the conversation utilizing the identities of those in the conversation and their location data. Further, in some use cases, the IIOs may be executed in the context of the conversation utilizing the identities of those in the conversation and the data expressed in conversation text and media objects. Furthermore, the IIOs run in the context of the conversation utilizing the identities of those in the conversation and beacons local to the members of the conversation. In some cases, the IIOs may send data and signals between IIOs to facilitate their interaction and operation. Additionally, in some use cases the IIOs could send data and signals between IIOs external to a message set to facilitate their interaction and operation. In yet other cases, the IIOs send data and signals between IIOs and internal device services to facilitate their interaction and operation. Further, the IIOs can send data and signals between IIOs and external services to facilitate the interaction and operation between the IIOs and those external services. Furthermore, in some cases, the IIOs can send data and signals between IIOs interacting with external devices and services that comprise the "Internet of Things" to facilitate their interaction and operation. Further, in some cases, the IIOs are able to send data and signals between IIOs and members of the conversation as well as to selected non-members of the conversation via email, SMS text, and other digital means. In many cases, the IIOs can operate in the computational foreground and be visible to the user but may also operate in the background, invisible to the user and/or in the conversation. Further, in some cases, the IIOs will operate dependent on input from users and other sources whereas in other conditions they may act independently from users or other input. In other cases, IIOs and collections of IIOs might be purchased and downloaded from an on-line store. In some of these cases, such sale to users can occur using in-app digital payment, on a one-time charge basis, or on a subscription basis, or similar, equivalent approaches. Further, in many contingencies, the IIOs include a permission model where each widget is granted permission by each participant in a conversation to access information for each of the participants' devices and personal data. Furthermore, in some cases, the system includes delivering programmatic message content in the form of a IIOs to a mobile, wearable, or fixed device, such cases include presenting IIOs and collections of IIOs via an interactive hierarchal form that is dynamically loaded on the mobile or fixed device. In some cases, further, the IIOs and collections of IIOs can be listed on a menu, palette, or similar visual selection object, and inserted into a conversation by a user making an interactive selection from a palette. In yet some additional cases, a list of IIOs and collections of IIOs can be changed both with and without an update to the messaging application where the collections of IIOs listed as well as the IIOs are dynamically loaded from the server and optionally cached locally on the target device. Further, in yet other cases, the IIOs that have been inserted into a conversation can be viewed in-line chronologically with other components of the conversation and in summary form, where only the IIOs in the conversation are visible. In yet other cases, the IIOs can be private to the conversation or public and shared via a URL or other networked mechanism, such as being viewable in a web browser or via other client application. Further, in some cases, the system is coupled to a control center connected to the network and configured to receive data from the messaging program, wherein the control center is further configured to track the delivery of the content item to the mobile or fixed device.

Figure 3:
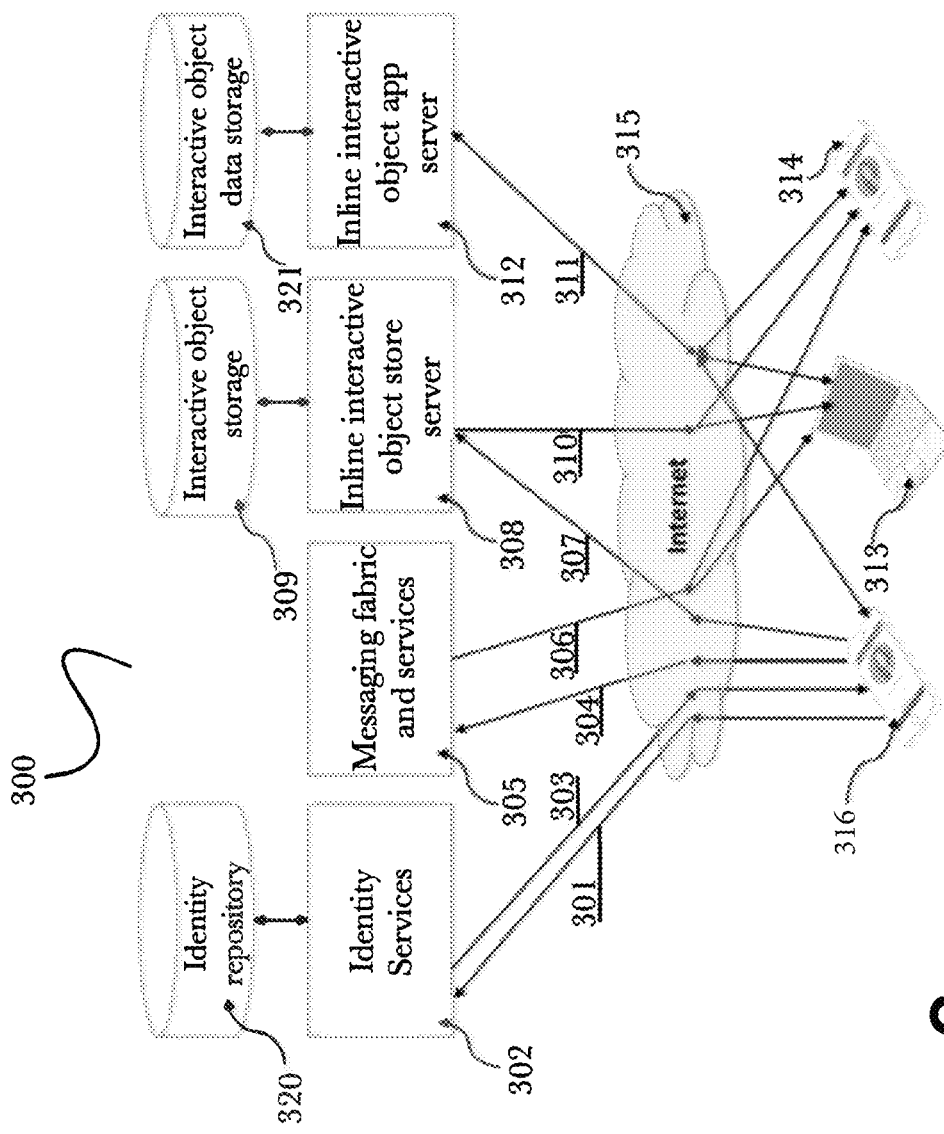
FIG. 3 shows an overview of the architecture of an exemplary system according to the system and method disclosed herein.

FIG. 3 shows an overview of the architecture of an exemplary system 300, according to the system and method disclosed herein. Devices 316 and 314 are, in this example, smart phones, while a third device 313 is a notebook computer. For purposes of this approach, any type of computing device, including but not limited to a kiosk, tablet, desktop computer, built-in appliance computer, etc. may be used. Identity services server 302 uses data from identity repository 320 to verify users when they want to create a new message or start a new conversation. Device 316 can send a message through Internet 315 via transmission means 301 and 303 to identity server 302 and can receive in return a token that certifies the device is entitled to send a message. Device 316 then may send a message through Internet 315 via transmission means 304 to messaging server 305. Attachments and content are sent via transmission means 307 and 311, respectively, to inline interactive object (IIO) store server 308 and to IIO app server 312.

An IIO may be represented in a message log in several ways, such as, for example, as a task shown at the time it is introduced; at the front of a conversation with a reference back to the time of introduction; or as a sequence of milestones appearing in multiple places in a conversation, corresponding to changes and refinements. It can also appear as an application completely external to the messaging application. Each server has its own data repository 309 and 321, respectively, for storage of objects and of apps and data, respectively. When the recipient receives a message his device downloads the message via transmission means 306 and then request that the content be downloaded via transmission means 310 and 311. To protect against the introduction of malware into the recipient's system, only certified content may be downloaded. It is clear that many variations of the details of this architecture may be implemented. For example, instead of using separate physical servers in separate locations, any or all servers may be virtual servers, or servers may be co-located, or they may all run on the same physical machine, or their functions may be allotted among multiple servers to accommodate high traffic.

Figure 4:
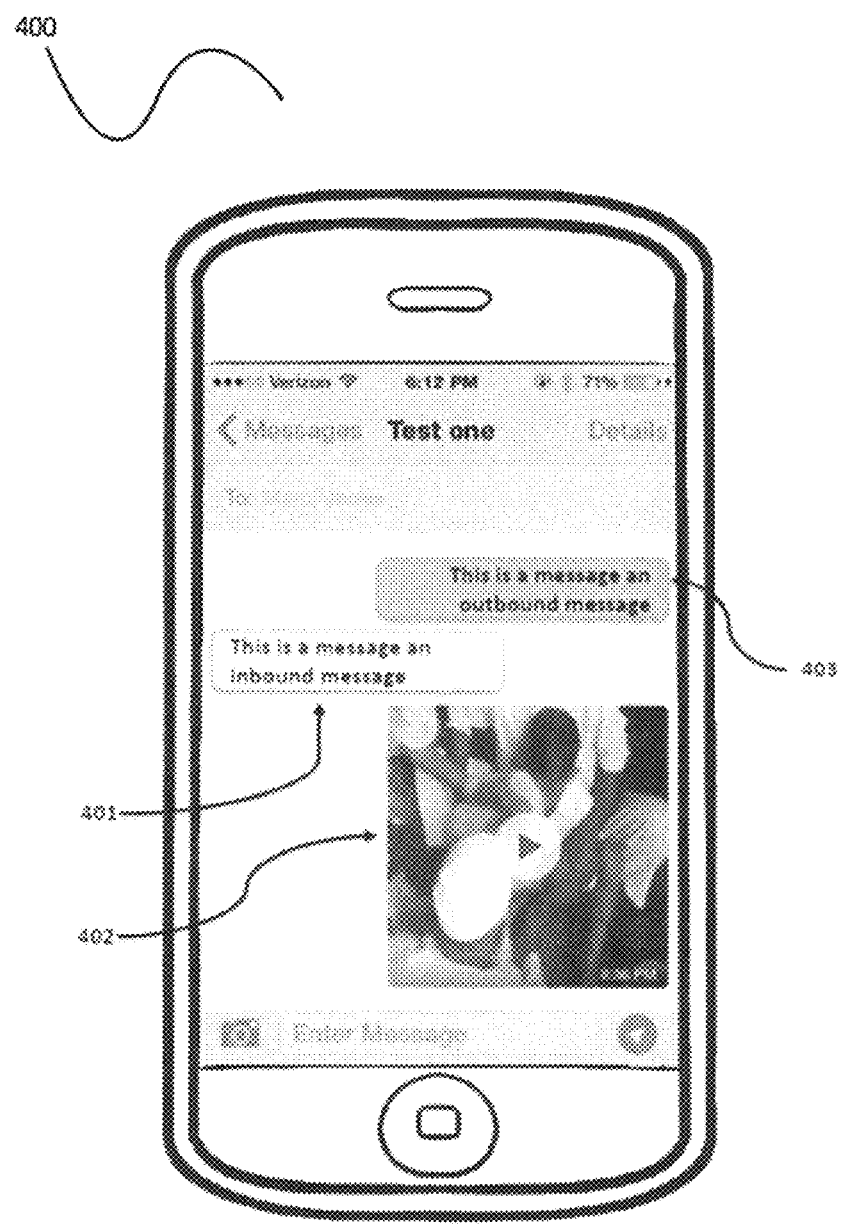
FIG. 4 shows an exemplary screen of a smartphone engaged in a conversation, according to one aspect of the system and method disclosed herein.

FIG. 4 shows an exemplary screen 400 of a smartphone engaged in a conversation, according to one aspect of the system and method disclosed herein. Displayed on the screen are outbound message 403, inbound message 401, and received object 402. A command means, such as, for example, a Play button, is presented on top of the image, in similar fashion as many websites present videos. Depending on the type of attachment, it may either launch an application that can play the content, or it may launch a built-in player to play the content.

Figure 5:
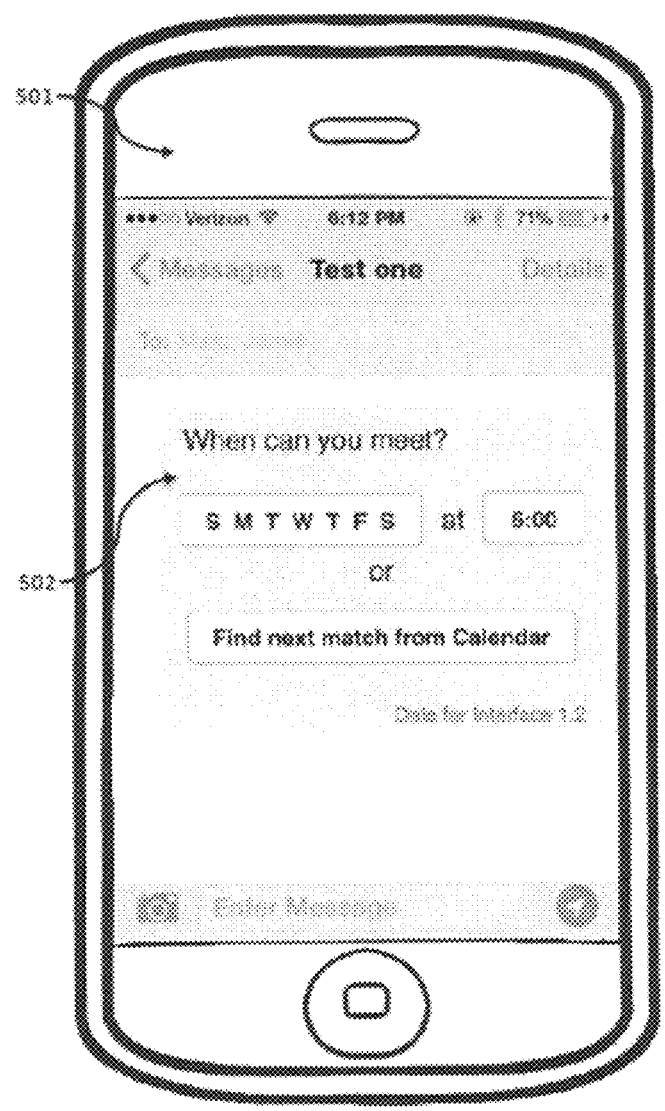
FIG. 5 shows an exemplary screen of a smartphone displaying a date object, according to one aspect of the system and method disclosed herein.

FIG. 5 shows an exemplary screen 500 of a smartphone displaying a date object, according to one aspect of the system and method disclosed herein. The user is preparing outbound message 502, with touch-screen options to select the date and time, or to select a calendar match if the calendars of the sender and receiver are linked. Thus the object sent can be linked to the sender's calendar, so when the recipient clicks "find next match," the system can access the sender's calendar, compare it to the recipient's calendar, and propose one or more available time slots. In some cases, the process of completion may be interwoven with the discussion in plain chat messages. This milestone view could function as a rollback mechanism, similar to implementations in Wiki systems. For example, open editing of IIOs among mutually trusting individuals in a group can be much easier to administer than the usual permissions-based approach used in computer security. Intermixing IIOs with conventional messaging also enables the message log to serve other purposes beyond providing a record of communication. Intermixed IIOs can describe media presentations (similar to a theatrical script), or describe a plan and/or a process, as well as a pedagogical sequence or recipe.

Figure 6:
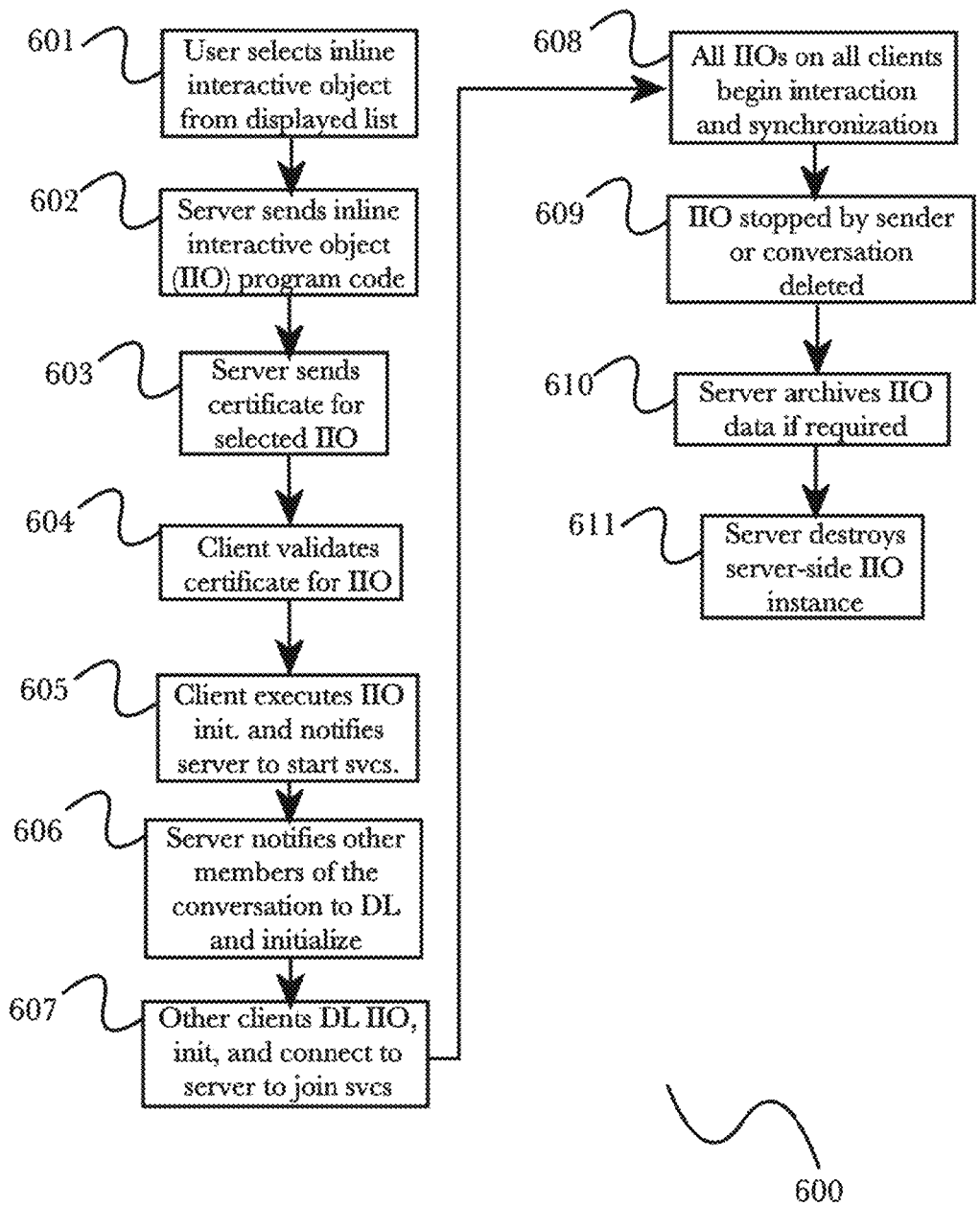
FIG. 6 shows an exemplary process for implementation of the system according to one aspect of the system and method disclosed herein.

FIG. 6 shows an exemplary process 600 for implementation of the system according to one aspect of the system and method disclosed herein. In step 601, the user selects an inline interactive object (IIO), which may be any of various, including, but not limited to, for example, a calendar matching app as shown in FIG. 5, sharing to-do lists, delivering shopping lists, exchanging locations in real-time, doing opinion polls, distributing invitations (including integration with commercial services such as EventBrite, MeetUp, and others), buying movie tickets (including integration with commercial services such as Fandango), making reservations (including integration with commercial services such as OpenTable), meeting planning, meeting notes, corporate approvals, monitoring Wearables (personal trainer applications that integrate in local information and data from third-party IoT products such as FitBit), sending and/or purchasing a product (including integration with commercial services such as Amazon), transferring cash between parties in the conversation (including integration with commercial services such as PayPal to facilitate the transfer), sharing and viewing media together, and playing turn-based and interactive games. In step 602, the IIO store server 308 sends the IIO program code to the client device, and in step 603, the IIO store server 308 sends a certificate for the selected IIO. In step 604, the client device validates the certificate for the IIO with the identity services server 302, and in step 605, the client device executes the IIO initialization and notifies the server to start IIO services. In step 606, the messaging fabric server 305 notifies other members of the conversation to download and initialize and interaction. In step 607, other clients download the IIO, initialize, and connect to the server to join IIO services. In step 608, all IIOs on all clients begin interactions and synchronization. In step 609, the IIO is stopped by the sender or the conversation is deleted. In step 610, the server archives the IIO data if required, and in step 611, the IIO store server 308 destroys the IIO instance that is on the server.

Various embodiments of the present disclosure may be implemented in computer hardware, firmware, software, and/or combinations thereof. Methods of the present disclosure can be implemented via a computer program instructions stored on one or more specifically designed non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors, which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In one embodiment, an IIO may represent standard transactions between parties, such as an order for a product, the terms of a contract, etc. As a standard process for mutual communication, an IIO may be used to enable parties to interact across language and cultural barriers, for example, by offering both English and Chinese interface presentations. Also, a formal process of conducting group business, such as Robert's Rules of Order can be reified as IIOs that represent reports, motions, votes, and so on, so that parliamentary business can proceed without a real-time, single-location meeting of the polity. IIOs can likewise represent steps in legal proceedings. Additionally, IIO progress and chat traffic involving one or more conversations may be plotted in several time-line forms, so that a user can reconstruct his activities and relate separate flows of communication together. In further embodiments, a system for recording conversations that includes IIOs enables programming by example. For example, a conversation log can be edited to create a standard narrative description of a process that may be applied to a new situation.

In some cases, a system and method for delivering text, media, and inline interactive objects in a message and displaying them by a messaging program to a device such as, for example, a mobile phone, may comprise a messaging service and fabric that reliably and securely transports text, media, and IIOs along with an optional proprietary electronic certificate to ensure that the delivered elements have been sent from an authorized source. The system may send message content, including text, media, and IIOs, via the Internet to the messaging program, which may be a web application or a compiled mobile or desktop application, configured to interact with the user based on the user's identifier. Further, message content may be stored on a server, for delivery to the message program on demand and thence to the client device. In addition, the message program may be received from a server. The messaging program may also upload a message to a server for distribution to other parties and/or processing by external programs or via server side extensions of the message content. Additionally, a control center may be connected to the network and configured to receive data from the messaging program and to track the delivery of the message content.

Further, in some cases, along with the message an inline interactive objects program code is provided, and in some cases providing those IIO programs includes downloading additional IIOs from a server to a message delivery program. Additionally, in some of these cases, a portion or all of the IIO code includes executing code in a server that hosts or interacts with the remote IIO code. Furthermore, in some cases part or all of the selected message content is used for additional information for processing by the selected IIOs from another computer. In yet other cases, the method for processing a message includes selecting the selected IIO and executing the code on the selected IIO. In some cases, the messaging program may also upload a message to a server for distribution to other parties and/or processing by external programs or via server side extensions of the message content while monitoring the delivery of the selected message content. Furthermore, a method delivers IIOs to a mobile or fixed device, including the steps of providing IIO program code to the messaging program that can interact with the user in the context of the conversation, other IIOs within the message, IIOs external to the message, as well as internal and external services and devices. Additionally, in some of these cases, the IIO is further applied operating in the context of the conversation utilizing multiple classes of contextual information. In yet further of these cases, the IIO operating in the context of the conversation is applied utilizing the identities of those in the conversation to supply the context. In yet other cases, the IIOs operating in the context of the conversation are also applied utilizing the identities of those in the conversation to extract information from external sources, such as identity management solutions and external data sources such as Facebook and LinkedIn. In yet other cases, the IIOs are operated in the context of the conversation utilizing the identities of those in the conversation and their respective calendars. Additionally, the IIOs are operated in the context of the conversation utilizing the identities of those in the conversation and their location data. Further, the IIOs are operated in the context of the conversation utilizing the identities of those in the conversation and the data expressed in conversation text and media objects. Furthermore, the IIOs run in the context of the conversation utilizing the identities of those in the conversation and beacons local to the members of the conversation. In some cases, the IIOs send data and signals between IIOs to facilitate their interaction and operation. In yet other cases, the IIOs send data and signals between IIOs within a message to facilitate their interaction and operation. Additionally, in some cases the IIOs send data and signals between IIOs external to a message to facilitate their interaction and operation. In yet other cases, the IIOs send data and signals between IIOs and internal device services to facilitate their interaction and operation. Further, the IIOs send data and signals between IIOs and external services to facilitate their interaction and operation. Furthermore, in some cases, the IIOs send data and signals between IIOs by and for as well as including external devices and services that comprise the "Internet of Things" to facilitate their interaction and operation. Further, in some cases, the IIOs send data and signals between IIOs and members of the conversation as well as to selected non-members of the conversation via email, SMS text, and other digital means. In other cases, the IIOs can operate in the computational foreground and be visible to the user as well as operate in the background, invisible to the user and/or in the conversation. Further, in some cases, the IIOs operate dependent on input from users and other sources as well as independently from users or other input. In other cases, the IIOs and collections of IIOs are purchased and downloaded from an on-line store, In some of these cases, such sale to users can occur using in-app digital payment, on a one-time charge basis, or on a subscription basis, or similar, equivalent approaches. Further, in some cases, the IIOs support a permission model where each widget is granted permission by each participant in a conversation to access information for each of the participants' devices and personal data. Furthermore, in some cases, the system includes delivering programmatic message content in the form of a IIOs to a mobile or fixed device, such cases include presenting IIOs and collections of IIOs via an interactive hierarchal form that is dynamically loaded on the mobile or fixed device. In some cases, further, the IIOs and collections of IIOs can be listed on a menu, palette, or similar visual selection object, and inserted into a conversation by a user making an interactive selection from a palette. In yet some additional cases, a list of IIOs and collections of IIOs can be changed both with and without an update to the messaging application where the collections of IIOs listed as well as the IIOs are dynamically loaded from the server and optionally cached locally on the target device. Further, in yet other cases, the IIOs that have been inserted into a conversation can be viewed in-line chronologically with other components of the conversation and in summary form, where only the IIOs in the conversation are visible. In yet other cases, the IIOs can be private to the conversation or public and shared via a URL or other networked mechanism, such as being viewable in a web browser or via other client application. Further, in some cases, the system is coupled to a control center connected to the network and configured to receive data from the messaging program, wherein the control center is further configured to track the delivery of the content item to the mobile or fixed device.

The skilled person will be aware of a range of possible modifications of the various embodiments described above. Accordingly, the present invention is defined by the claims and their equivalents.

What is claimed is:

1. A system for delivery of text, media and inline interactive objects encapsulated in a message, the system comprising:

a message server stored in a memory of and operating on a processor of a computing device;

an inline interaction object repository stored in a memory of and operating on a processor of a computing device; and a plurality of message delivery devices each stored in a memory of and operating on a processor of a computing device;

wherein the message server:

receives a first message which comprises content requiring the use of an inline interactive object to display or manipulate;

determines from a target message delivery device whether that target device has all inline interactive objects needed to render and manipulate the inline interactive objects included in the first message; and provides a method to procure any inline interactive objects needed to render or manipulate inline data encapsulated within the first message;

wherein the inline interaction object repository:

maintains copies of inline interactive objects available for download; and wherein the message delivery devices:

accept a second message comprising encapsulated interactive data;

run inline interactive object resources needed to render and manipulate encapsulated content within the second message; and allow a first user to initiate a third message to a second user using an identification for the second user.

2. The system of claim 1, wherein the message server coordinates the sharing and data integrity of an inline interaction data object manipulated by a plurality of inline interaction objects during the course of a message conversation.

3. The system of claim 1, wherein at least one message delivery device is the result of running compiled programing code on a more generalized computing device.

4. The system of claim 1, wherein at least one message delivery device is the result of running a web application within a browser on a generalized computing device such as a smartphone, tablet, laptop computer or desktop personal computer.

5. The system of claim 1, wherein a message conversation participant sends a security token to the message server to authenticate the participant's identity.

6. The system of claim 1, wherein the inline interactive object repository and the message server reside on the same computing device.

7. The system of claim 1, wherein an inline interactive object repository is provided by a third party that offers inline interactive objects of their design from that resource.

8. The system of claim 1, wherein an inline interactive object is offered on a for-purchase or a subscription-to-use basis.

9. A method for delivery of text, media and inline interactive objects encapsulated in a message the steps of the method comprising:

(a) receiving a message at a message server, the message containing inline media and data that require the use of inline interactive programming objects to render and manipulate;

(b) checking if a first message delivery device to which the message is addressed has all inline interactive programming objects required to render and manipulate the additional inline media and data;

(c) sending an alert offering to provide any missing inline interactive programming objects; and (d) allowing the first message delivery device to enter an interactive conversation with one or more second message delivery devices to interact as a group with the additional inline media and data while concurrently communicating with additional messages, some of which encapsulate novel additional inline media and data.

10. The method of claim 9, wherein the message server coordinates the sharing and data integrity of at least one inline interaction data object manipulated by inline interaction objects during the course of the interactive conversation.

11. The method of claim 9, wherein at least one message delivery device is the result of running compiled programing code on a more generalized computing device.

12. The method of claim 9, wherein at least one message delivery device is the result of running a web application within a browser on a more generalized computing device.

13. The method of claim 9, wherein an interactive conversation participant sends a security token to the message server to authenticate the participant's identity.

14. The method of claim 9, wherein an inline interactive object repository and the message server reside on the same computing device.

15. The method of claim 9, wherein an inline interactive object repository is provided by a third party and that third party offers a plurality of inline interactive objects of their design from that resource.

16. The method of claim 9, wherein at least one inline interactive object is offered on a for-purchase or a subscription-to-use basis.

* * * * *